United States Patent
Asada et al.

(10) Patent No.: US 12,351,420 B2
(45) Date of Patent: Jul. 8, 2025

(54) CONVEYANCE DEVICE, DRYING DEVICE, IMAGE FORMING APPARATUS, AND LIQUID DISCHARGE APPARATUS

(71) Applicants: Kohki Asada, Tokyo (JP); Kenji Nozawa, Kanagawa (JP); Genichiroh Kawamichi, Ibaraki (JP); Takayuki Seki, Kanagawa (JP); Kazuaki Kamihara, Tokyo (JP); Ryusaku Hida, Kanagawa (JP)

(72) Inventors: Kohki Asada, Tokyo (JP); Kenji Nozawa, Kanagawa (JP); Genichiroh Kawamichi, Ibaraki (JP); Takayuki Seki, Kanagawa (JP); Kazuaki Kamihara, Tokyo (JP); Ryusaku Hida, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 148 days.

(21) Appl. No.: 18/369,235

(22) Filed: Sep. 18, 2023

(65) Prior Publication Data

US 2024/0092595 A1   Mar. 21, 2024

(30) Foreign Application Priority Data

Sep. 20, 2022 (JP) .................. 2022-149225
Jul. 18, 2023 (JP) .................. 2023-116749

(51) Int. Cl.
*B65H 5/02*   (2006.01)
*B41J 11/00*   (2006.01)
*B65H 5/36*   (2006.01)

(52) U.S. Cl.
CPC ........ *B65H 5/021* (2013.01); *B41J 11/00214* (2021.01); *B41J 11/0024* (2021.01);
(Continued)

(58) Field of Classification Search
CPC .... B65H 5/021; B65H 5/36; B65H 2301/517; B65H 29/16; B65H 29/56;
(Continued)

(56) References Cited

U.S. PATENT DOCUMENTS

2008/0043083 A1   2/2008 Imoto et al.
2014/0232797 A1   8/2014 Onodera et al.
(Continued)

FOREIGN PATENT DOCUMENTS

JP   2005-262519 A   9/2005
JP   2014-102286 A   6/2014
(Continued)

OTHER PUBLICATIONS

Extended European Search Report issued Jan. 29, 2024 in European Patent Application No. 23197342.1, 6 pages.

*Primary Examiner* — Bradley W Thies
(74) *Attorney, Agent, or Firm* — XSENSUS LLP

(57) ABSTRACT

A conveyance device includes a conveyance member, a guide, and a rotator. The conveyance member has a conveyance surface with a joint, the conveyance member to convey an object to be conveyed, with the object on the conveyance surface. The guide approaches the conveyance surface and guides the object from or to the conveyance member. The rotator contacts the conveyance surface. The guide displaces in a direction perpendicular to the conveyance surface, in conjunction with displacement of the rotator when the rotator contacts the joint.

10 Claims, 9 Drawing Sheets

(52) U.S. Cl.
CPC .............. *B41J 11/007* (2013.01); *B65H 5/36* (2013.01); *B65H 2301/517* (2013.01)

(58) Field of Classification Search
CPC ........ B65H 2404/2691; B65H 2404/61; B65H 2404/62; B65H 2801/06; B65H 2801/15; B65H 5/38; B65H 29/52; B41J 11/00214; B41J 11/0024; B41J 11/007; B41J 11/002; B65G 47/66; F16G 3/10
See application file for complete search history.

(56) References Cited

U.S. PATENT DOCUMENTS

| | | |
|---|---|---|
| 2015/0174921 A1 | 6/2015 | Onodera et al. |
| 2015/0224802 A1 | 8/2015 | Kawamichi et al. |
| 2015/0346659 A1 | 12/2015 | Nagayama et al. |
| 2016/0273832 A1 | 9/2016 | Asada et al. |
| 2017/0266987 A1 | 9/2017 | Asada et al. |
| 2017/0266988 A1 | 9/2017 | Asada et al. |
| 2017/0334218 A1 | 11/2017 | Ogawa et al. |
| 2018/0016106 A1 | 1/2018 | Asada et al. |
| 2018/0147878 A1 | 5/2018 | Asada et al. |
| 2018/0264852 A1 | 9/2018 | Ohtake et al. |
| 2019/0030913 A1 | 1/2019 | Inaba et al. |
| 2019/0047298 A1 | 2/2019 | Hashimoto et al. |
| 2019/0202215 A1 | 7/2019 | Asada et al. |
| 2019/0283069 A1 | 9/2019 | Nakagaki et al. |
| 2020/0238725 A1 | 7/2020 | Nozawa |
| 2020/0290383 A1 | 9/2020 | Ishihara et al. |
| 2020/0360962 A1 | 11/2020 | Nakagaki et al. |
| 2021/0031542 A1 | 2/2021 | Kamihara et al. |
| 2021/0197584 A1 | 7/2021 | Asada et al. |
| 2021/0221149 A1 | 7/2021 | Nakamura et al. |
| 2021/0370692 A1 | 12/2021 | Sawase et al. |
| 2022/0063300 A1 | 3/2022 | Asada et al. |
| 2022/0080749 A1 | 3/2022 | Kawamichi et al. |
| 2022/0111663 A1* | 4/2022 | Kamihara .......... B41J 11/00216 |
| 2022/0242142 A1 | 8/2022 | Asada et al. |
| 2022/0281241 A1 | 9/2022 | Sawase et al. |
| 2022/0402280 A1 | 12/2022 | Asada et al. |
| 2023/0011940 A1 | 1/2023 | Hida et al. |
| 2023/0108116 A1 | 4/2023 | Hiroshi et al. |

FOREIGN PATENT DOCUMENTS

| | | |
|---|---|---|
| JP | 2019-151455 A | 9/2019 |
| JP | 2022-064251 A | 4/2022 |

* cited by examiner

CONVEYANCE DEVICE, DRYING DEVICE, IMAGE FORMING APPARATUS, AND LIQUID DISCHARGE APPARATUS

CROSS-REFERENCE TO RELATED APPLICATIONS

This patent application is based on and claims priority pursuant to 35 U.S.C. § 119(a) to Japanese Patent Application Nos. 2022-149225, filed on Sep. 20, 2022, and 2023-116749, filed on Jul. 18, 2023, in the Japan Patent Office, the entire disclosure of each of which is hereby incorporated by reference herein.

BACKGROUND

Technical Field

Embodiments of the present disclosure relate to a conveyance device, a drying device, an image forming apparatus, and a liquid discharge apparatus.

Related Art

In an image forming apparatus such as a copier or a printer, a conveyance device that conveys a sheet is provided.

As such a conveyance device, there is a conveyance device that includes a conveyance belt to support a sheet on a surface thereof and convey the sheet and a guide to guide the sheet from or to the conveyance belt (see, for example, Japanese Unexamined Patent Application Publication No. 2014-102286).

Typically, a leading end of the guide is arranged in a non-contact manner with respect to the surface of the conveyance belt. However, when the distance between the leading end of the guide and the surface of the conveyance belt is excessively increased, there is a possibility that the sheet cannot be satisfactorily transferred between the guide and the conveyance belt. For this reason, the distance between the leading end of the guide and the surface of the conveyance belt is appropriately managed.

There is an endless conveyance belt that is wound around a plurality of support rollers and is endlessly formed by connecting both ends of a band-shaped belt so as to facilitate replacement work or maintenance work of components. In the case of such a conveyance belt, since there is a joint, the shape of the conveyance belt is non-uniform at a joint portion.

For example, in the case where the belt surface protrudes at the joint portion, the distance between the leading end of the guide and the belt surface to be large is set so that the leading end of the guide does not interfere with the protruding joint portion. However, in this case, since the distance between the guide and the conveyance belt becomes large particularly at a portion other than the joint, there is a possibility that the sheet enters between the guide and the conveyance belt, causing a paper jam or conveyance failure. In contrast, when the joint portion has a concave shape, the distance between the guide and the conveyance belt increases at the joint portion, so that the sheet might enter between the guide and the conveyance belt.

SUMMARY

According to an embodiment of the present disclosure, a conveyance device includes a conveyance member, a guide, and a rotator. The conveyance member has a conveyance surface with a joint, the conveyance member to convey an object to be conveyed, with the object on the conveyance surface. The guide approaches the conveyance surface and guides the object from or to the conveyance member. The rotator contacts the conveyance surface. The guide displaces in a direction perpendicular to the conveyance surface, in conjunction with displacement of the rotator when the rotator contacts the joint.

According to another embodiment of the present disclosure, a drying device includes the conveyance device to convey the object to be conveyed and a dryer to dry the object to be conveyed.

According to still another embodiment of the present disclosure, an image forming apparatus includes an image forming device to form an image on a sheet and the conveyance device to convey the sheet.

According to still yet another embodiment of the present disclosure, a liquid discharge apparatus includes a liquid discharger to discharge liquid onto a sheet and the conveyance device to convey the sheet.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
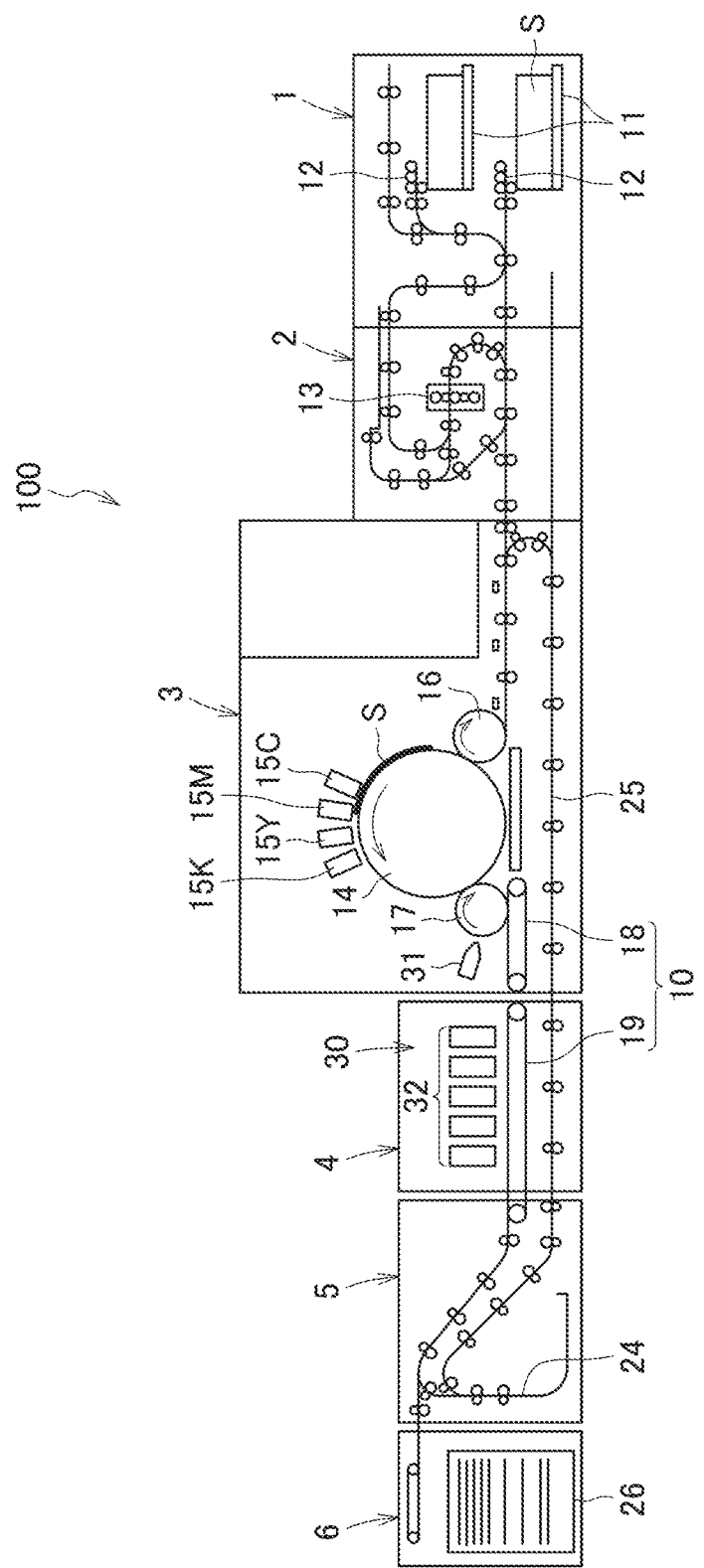
FIG. 1 is a schematic diagram illustrating a configuration of an inkjet image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

With reference to drawings, embodiments of the present disclosure are described in detail below. Note that identical reference numerals are assigned to identical components or equivalents and a redundant description of those components is appropriately simplified or omitted.

Hereinafter, an embodiment of the present disclosure will be described taking an example of a conveyance device mounted on an inkjet image forming apparatus. In the drawings for describing embodiments of the present disclosure, components such as members and constituent parts having the same function or shape are denoted by the same reference numerals as far as discriminable, and the description thereof will be omitted after once described.

First, a general arrangement of an inkjet image forming apparatus according to the present embodiment will be described with reference to FIG. 1.

An inkjet image forming apparatus 100 illustrated in FIG. 1 includes a sheet supply device 1, a pretreatment device 2, an image forming device 3, a drying unit 4, a sheet reversing device 5, and a sheet ejection device 6.

The sheet supply device 1 supplies a sheet as a recording medium on which an image is formed, and includes a supply tray 11 to accommodate a plurality of sheets S, and a feeder 12 that separates and feeds the sheets S one by one from the supply tray 11. The sheet S fed by the feeder 12 is supplied to the pretreatment device 2.

The pretreatment device 2 applies a treatment liquid to the sheet S supplied from the sheet supply device 1, and includes a treatment liquid applier 13 that applies the treatment liquid. The treatment liquid is, for example, a liquid having a function of aggregating ink, and is applied to the sheet S before image formation by the treatment liquid applier 13 for the purpose of enhancing an image quality such as preventing ink bleeding and assisting ink permeation. The sheet S to which the treatment liquid is applied is supplied to the image forming device 3.

The image forming device 3 forms an image on the supplied sheet S. Specifically, the image forming device 3 includes a drum 14 as a first bearing rotator that rotates while bearing the sheet S on an outer peripheral surface thereof, a plurality of liquid discharge units 15C, 15M, 15Y, and 15K as a liquid discharger that discharges liquid ink onto the sheet S borne on the drum 14, a transfer cylinder 16 as a second bearing rotator that transfers the sheet S supplied from the pretreatment device 2 to the drum 14, and a transfer cylinder 17 as a third bearing rotator that transfers the sheet S from the drum 14 to an upstream conveyance belt 18 included in a drying device 30 described later. In the example illustrated in FIG. 1, the liquid discharge unit 15C for cyan ink, the liquid discharge unit 15M for magenta ink, the liquid discharge unit 15Y for yellow ink, and the liquid discharge unit 15K for black ink are arranged in this order from an upstream side in a rotation direction of the drum 14 (conveyance direction of the sheet S). The arrangement of the liquid discharge units 15C, 15M, 15Y, and 15K is not limited to the order illustrated in FIG. 1, and may be in any other order. A liquid discharge unit that discharges ink of a special color such as white, gold, and silver may be added as necessary.

When the sheet S is supplied from the pretreatment device 2 to the image forming device 3, a leading end of the sheet S is gripped by a sheet gripper as a gripper included in the transfer cylinder 16, and the sheet S is conveyed with the rotation of the transfer cylinder 16. The sheet S is transferred to the drum 14 at a position where the transfer cylinder 16 and the drum 14 face each other. A sheet gripper as a gripper is disposed on the outer peripheral surface of the drum 14 in the same manner as the transfer cylinder 16, and the leading end of the sheet S is gripped by the sheet gripper. A plurality of suction holes are dispersedly formed on the outer peripheral surface of the drum 14, and airs flow sucked into the drum 14 from suction holes can be generated by a suction device. As a result, the sheet S is attracted by the outer peripheral surface of the drum 14 to be borne thereon. The sheet S is conveyed with the rotation of the drum 14 while being borne on the outer peripheral surface of the drum 14 by an attracting action of the sheet gripper and the air flow.

Figure 2:
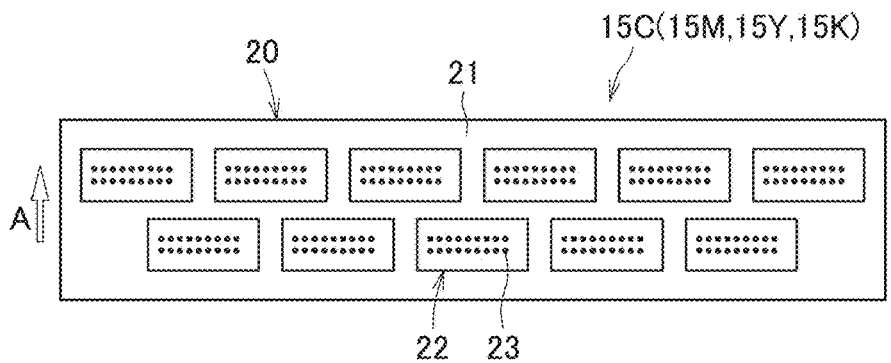
FIG. 2 is a plan view of a liquid discharge unit according to an embodiment of to the present disclosure.

Then, when the sheet S on the drum 14 is conveyed to a position facing each of the liquid discharge units 15C, 15M, 15Y, and 15K, ink is discharged from each of the liquid discharge units 15C, 15M, 15Y, and 15K onto the sheet S. Each of the liquid discharge units 15C, 15M, 15Y, and 15K includes, for example, a head module 20 including a full-line head as illustrated in FIG. 2. Specifically, the head module 20 includes a base 21 and a plurality of liquid discharge heads 22 alternately arranged on the base 21. The liquid discharge heads 22 each includes a plurality of nozzle rows including a plurality of nozzles 23 arrayed in a sheet width direction (lateral direction in FIG. 2) orthogonal to a sheet conveyance direction A.

As illustrated in FIG. 1, when the sheet S is conveyed to a position facing each of the liquid discharge units 15C, 15M, 15Y, and 15K, discharge drive of each of the liquid discharge units 15C, 15M, 15Y, and 15K is controlled by a drive signal based on image information, and the ink is discharged from each of the liquid discharge units 15C, 15M, 15Y, and 15K onto the sheet S. As a result, an image corresponding to the image information is formed on the sheet S. The sheet S is transferred from the drum 14 to the transfer cylinder 17, and then transferred from the transfer cylinder 17 to the upstream conveyance belt 18.

The drying unit 4 includes the drying device 30 that heats the sheet S to dry the ink on the sheet S. The drying device 30 includes a first heating unit 31 that heats the sheet S borne on the transfer cylinder 17, a second heating unit 32 that heats the sheet S again after the heating by the first heating unit 31, the upstream conveyance belt 18 as a first conveyance member to which the sheet S is transferred from the transfer cylinder 17, and a downstream conveyance belt 19 as a second conveyance member that conveys the sheet S on a downstream side in the sheet conveyance direction with respect to the upstream conveyance belt 18. The first heating unit 31 and the second heating unit 32 are dryers that heat the sheet S to dry the ink, and the upstream conveyance belt 18 and the downstream conveyance belt 19 form a conveyance device 10 that conveys the sheet S in the drying device 30.

When the sheet S is borne on the transfer cylinder 17, the sheet S is heated by the first heating unit 31. While being heated on the transfer cylinder 17, the sheet S is transferred from the transfer cylinder 17 to the upstream conveyance belt 18 at a position where the transfer cylinder 17 faces the upstream conveyance belt 18. The sheet S is further transferred from the upstream conveyance belt 18 to the downstream conveyance belt 19. When the sheet S reaches a position facing the second heating unit 32 along with the conveyance of the downstream conveyance belt 19, the sheet S is heated by the second heating unit 32. In this manner, the sheet S is heated by the first heating unit 31 and the second heating unit 32, so that the drying of the ink on the sheet S is promoted.

The sheet reversing device 5 reverses the front side and the back side of the sheet S to convey to the image forming device 3 again in a case of duplex printing. Specifically, the sheet reversing device 5 includes a switchback conveyor 24 that conveys the sheet S in an opposite direction by a switchback system, and a duplex conveyor 25 that conveys the switch-backed sheet S to an upstream side from the transfer cylinder 16 in the sheet conveyance direction. In the case of forming images on both sides of the sheet S, after an image is formed on the front side of the sheet S in the image forming device 3, the sheet S is conveyed to the sheet reversing device 5 after a drying process in the drying unit 4, and conveyed in the opposite direction by the switchback conveyor 24. The sheet S is conveyed to the upstream side from the transfer cylinder 16 through the duplex conveyor 25. As a result, the sheet S is supplied to the image forming device 3 in a state of being reversed. Then, after an image is formed on the back side of the sheet S in the image forming device 3, the sheet S is conveyed from the sheet reversing device 5 to the sheet ejection device 6 through the drying process by the drying unit 4.

The sheet S on one side or both sides of which an image is formed is ejected to the sheet ejection device 6. The sheet ejection device 6 includes an ejection tray 26 on which the ejected sheets S are stacked. When the sheet S is conveyed from the sheet reversing device 5 to the sheet ejection device 6, the sheets S are sequentially stacked and placed on the ejection tray 26.

An overall configuration of the drying device 30 according to the present embodiment is described below with reference to FIG. 3.

Figure 3:
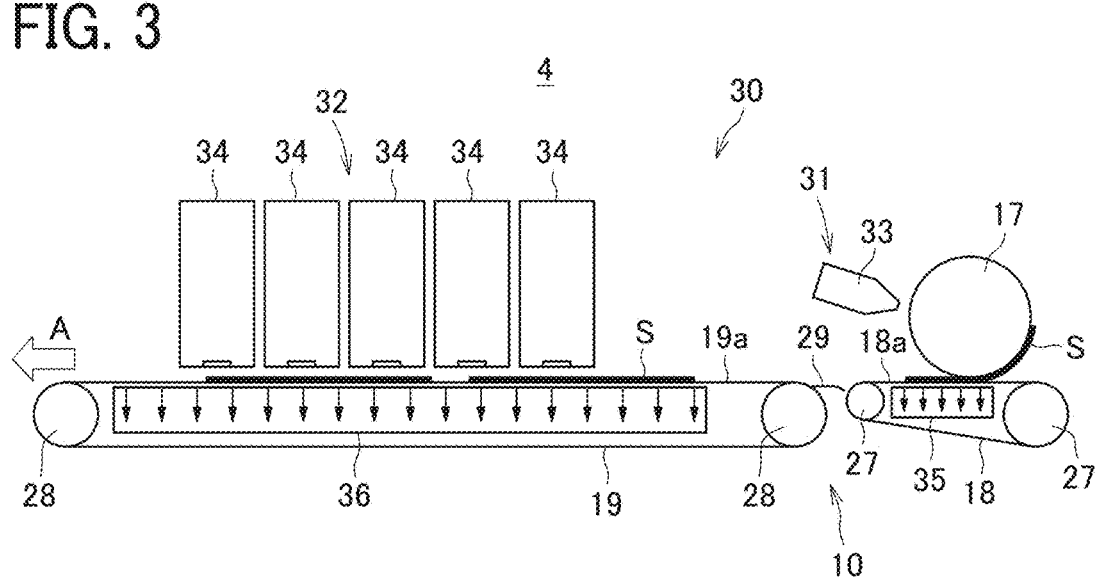
FIG. 3 is a diagram illustrating a general arrangement of a drying device according to an embodiment of to the present disclosure.

As illustrated in FIG. 3, the first heating unit 31 included in the drying device 30 includes a warm air generator 33. The warm air generator 33 is disposed in a non-contact manner so as to face the outer peripheral surface of the transfer cylinder 17. The warm air generator 33 is provided with a heater that generates hot air and a nozzle that blows the generated hot air as warm air toward the transfer cylinder 17. By the warm air blown from the nozzle to the outer peripheral surface of the transfer cylinder 17, the outer peripheral surface of the transfer cylinder 17 is warmed. As a result, the sheet S on the transfer cylinder 17 is heated, and an ink drying process is performed.

The warm air generator 33 can adjust the temperature of the warm air in the rage from room temperature to about 100° C. based on the temperature detected by a temperature detection sensor mounted thereon. The temperature of the warm air can be optionally set according to information such as the amount of liquid (ink) adhered to a sheet S and the type (material) of sheet. From the viewpoint of reducing waviness (cockling) of a sheet due to application of liquid such as ink, low-temperature warm air is preferably blown, for example, with the heater turned off.

As illustrated in FIG. 3, the second heating unit 32 included in the drying device 30 includes a plurality of ultraviolet irradiators 34 arranged in the sheet conveyance direction A. The ultraviolet irradiators 34 are arranged above the downstream conveyance belt 19 so as to face the downstream conveyance belt 19, and irradiates a sheet S conveyed by the downstream conveyance belt 19 with ultraviolet rays to heat the sheet S.

Figure 4:
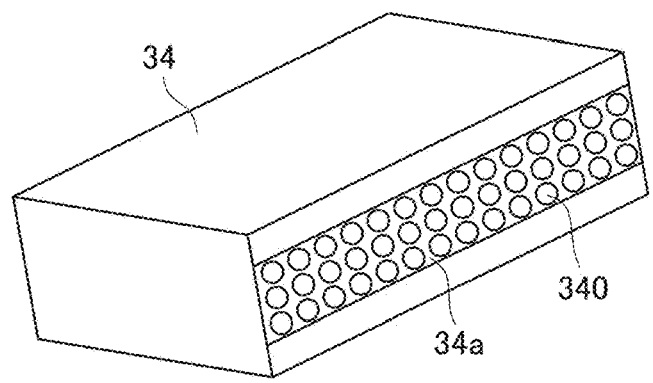
FIG. 4 is a perspective view of an ultraviolet irradiator according to an embodiment of the present disclosure.

As illustrated in FIG. 4, the ultraviolet irradiator 34 includes an irradiation surface 34a on which a plurality of granular ultraviolet-light-emitting diode (UV-LED) light emitting elements 340 are arranged. Since each UV-LED light emitting element 340 emits light with the same illuminance, the irradiation surface 34a uniformly emits light as a whole. As ultraviolet light (UV light), for example, one having a peak wavelength of 395 nm and a full width at half maximum of about 15 nm as the wavelength distribution is used. However, the peak wavelength and wavelength distribution of the UV light are not limited thereto.

As illustrated in FIG. 3, the drying device 30 includes the conveyance device 10 including the upstream conveyance belt 18 and the downstream conveyance belt 19. The upstream conveyance belt 18 is wound and supported around a plurality of support rollers 27 in endless form. When at least one of the plurality of support rollers 27 functions as a drive roller, the upstream conveyance belt 18 rotates (circulates). Although the upstream conveyance belt 18 is supported by the two support rollers 27 in the present embodiment, in some embodiments, the number of support rollers 27 supporting the upstream conveyance belt 18 may be two or more. In the present embodiment, as the upstream conveyance belt 18, a mesh belt or a plain-woven belt provided with a large number of holes on a conveyance surface (outer peripheral surface) 18a that holds the sheet S is used. The term "conveyance surface" as used herein means a portion forming a planar conveyance path, on which a sheet being an object to be conveyed is held or placed. The portion contacting the sheet is not necessarily a surface, and may be, for example, a mesh. A suction chamber 35 including a blower or a fan as a suction device is arranged inside the upstream conveyance belt 18. As a result, when the suction chamber 35 is driven and air is sucked from a large number of holes on the conveyance surface 18a of the upstream conveyance belt 18, the sheet S is attracted to the conveyance surface 18a by the sucked air. The upstream conveyance belt 18 rotates in a state in which the sheet S is attracted, so that the sheet S is conveyed downstream.

The downstream conveyance belt 19 arranged downstream from the upstream conveyance belt 18 in the sheet conveyance direction is basically configured in the same manner as the upstream conveyance belt 18. In other words, the downstream conveyance belt 19 is endlessly wound around a plurality of support rollers 28, and at least one of the support rollers 28 functions as a drive roller to rotate (circulate). In the present embodiment, the downstream conveyance belt 19 is supported by the two support rollers 28. However, in some embodiments, the number of support rollers 28 supporting the downstream conveyance belt 19 may be two or more. A suction chamber 36 is disposed inside the loop of the downstream conveyance belt 19. When the suction chamber 36 is driven and air is sucked from a large number of holes on a conveyance surface 19a of the downstream conveyance belt 19, the sheet S is attracted to the conveyance surface 19a by the sucked air. When the downstream conveyance belt 19 rotates with the sheet S attracted on the conveyance surface 19a, the sheet S is conveyed downstream.

A mechanism for attracting the sheet S to the upstream conveyance belt 18 and the downstream conveyance belt 19 is not limited to the mechanism using the airflow as described above, and may be an electrostatic attraction mechanism for attracting the sheet to the belt using static electricity. A grip unit such as a gripper may be disposed on each of the conveyance belts 18 and 19, and the sheet may be gripped by the grip unit.

As illustrated in FIG. 3, a guide 29 is arranged between the upstream conveyance belt 18 and the downstream conveyance belt 19. That is, the conveyance device 10 according to the present embodiment includes the guide 29 that guides the sheet S from the upstream conveyance belt 18 to the downstream conveyance belt 19 in addition to the upstream conveyance belt 18 and the downstream conveyance belt 19. The guide 29 is arranged close to the conveyance surfaces 18a and 19a of the upstream conveyance belt 18 and the downstream conveyance belt 19, respectively, so as not to come into contact with them.

The drying device 30 configured as described above operates as follows.

First, when the sheet S is borne on the transfer cylinder 17, the heat of the transfer cylinder 17 heated by the warm air generator 33 to the sheet S is applied to the sheet S and the sheet S is heated. As a result, the drying of the ink on the sheet S is promoted, and a first drying process is performed on the sheet S. The sheet S is transferred to the upstream conveyance belt 18 while being heated on the transfer cylinder 17, and is conveyed by the upstream conveyance belt 18. Thereafter, the sheet S is guided to the downstream conveyance belt 19 via the guide 29, and is conveyed by the downstream conveyance belt 19. When the sheet S reaches a position facing each ultraviolet irradiator 34 along with the conveyance of the downstream conveyance belt 19, each ultraviolet irradiator 34 irradiates the sheet S with ultraviolet rays to heat the sheet S. Therefore, a second drying process is performed on the sheet S.

In this manner, in the drying device 30 according to the present embodiment, after the first drying process of heating the sheet S by the heat of the transfer cylinder 17 heated by the warm air generator 33 is performed, the second drying process of heating the sheet S by the ultraviolet rays from each ultraviolet irradiator 34 is performed. Thus, the ink on the sheet S can be effectively dried.

In the drying device 30 according to the present embodiment, since the ultraviolet irradiator 34 is used as a heating device for performing the second drying process, only an image portion (portion to which the ink is applied) of the sheet S can be selectively heated. As a result, the temperature of a non-image portion (portion to which no ink is applied) of the sheet S does not rise more than necessary, and excessive evaporation of moisture contained in the non-image portion can be reduced, so that waviness of the sheet S can be reduced.

As a heating device for heating the sheet S, in addition to the ultraviolet irradiator, an infrared irradiator for emitting infrared rays to heat an object such as an IR lamp may be used, but the ultraviolet irradiator is more preferable than the infrared irradiator from the viewpoint of appropriately maintaining the moisture amount of the sheet after the drying process. In fact, when a test was conducted in which the sheet was heated using the infrared irradiator and the ultraviolet irradiator and surface temperature of the sheet after heating was measured, there was a large difference in temperature of the non-image portion of the sheet after the drying process between a case of using the infrared irradiator and a case of using the ultraviolet irradiator. In general, in order to dry aqueous ink, it is necessary to raise the temperature of the image portion of the sheet to about 90° C., so that in this test, it was heated so that the temperature of the image portion reached 90° C. in both cases of using the infrared irradiator and using the ultraviolet irradiator. As a result, in a case of using the infrared irradiator, the temperature of the non-image portion of the sheet reached 105° C., whereas in a case of using the ultraviolet irradiator, the temperature of the non-image portion of the sheet was 45° C., which was lower by 60° C. than that in a case of using the infrared irradiator. When the water content of the non-image portion was measured, the water content of the non-image portion decreased from 6.1% to 1.4% in the case of using the infrared irradiator, whereas the water content of the non-image portion merely decreased from 6.1% to 2.9% in the case of using the ultraviolet irradiator. That is, it was confirmed that the moisture content of the non-image portion can be kept high in the case of using the ultraviolet irradiator as compared with the case of using the infrared irradiator. From this result also, it can be said that the ultraviolet irradiator is more preferable than the infrared irradiator in order to appropriately maintain the moisture amount of the sheet after the drying process.

In the drying device 30 according to the present embodiment, a belt endlessly wound around a plurality of support rollers is used as the upstream conveyance belt 18 and the downstream conveyance belt 19. As such endless belt, in addition to a seamless belt including no joint, a belt including a joint in a part in the rotation direction can be used. In particular, the type that can be separated at a joint portion has an advantage that the belt can be easily removed at the time of replacement work or maintenance work of the belt and other components. Therefore, in the present embodiment, a separable belt including the joint in a part in the rotation direction is used as the upstream conveyance belt 18 and the downstream conveyance belt 19.

Figure 5:
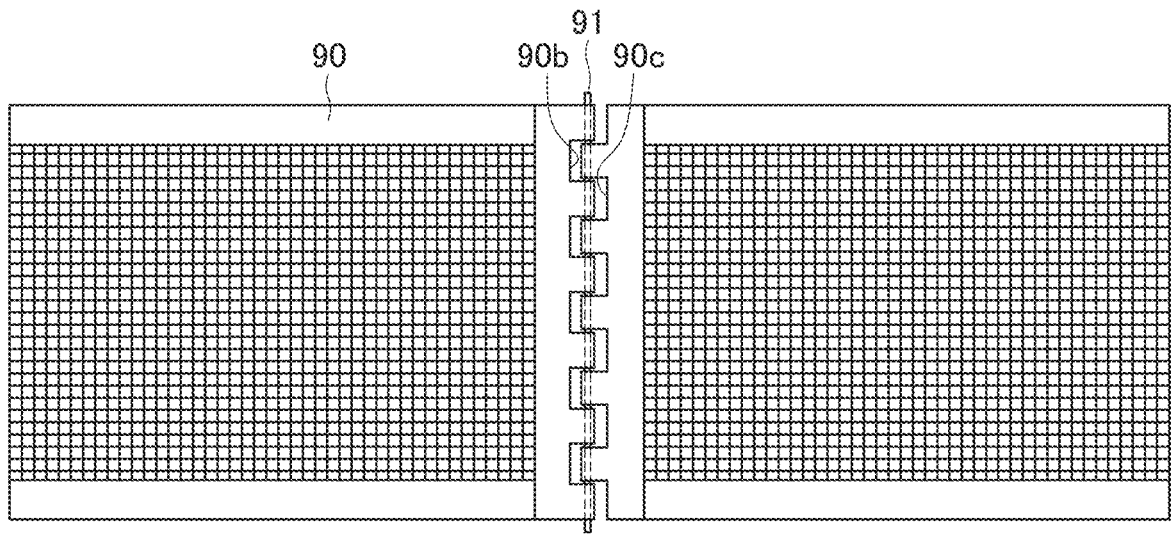
FIG. 5 is a plan view of a conveyance belt according to an embodiment of the present disclosure, illustrating a joint portion of the conveyance belt.

Specifically, as illustrated in FIG. 5, both ends 90b and 90c of the belt 90 are connected using a connecting member 91 such as a pin to make the belt 90 endless. In a case of such belt 90, the belt 90 can be easily attached by connecting both ends 90b and 90c of the belt 90 after winding the belt 90 around a plurality of support rollers, and conversely, the belt 90 can be easily detached by releasing the connection between both ends 90b and 90c. In FIG. 5, a case where a mesh-shaped belt is used is taken as an example, but a flat belt may be used. As a material of the belt, a material having heat resistance such as a fluorine-based material or a silicone-based material is preferable.

As described above, in a case of the belt that can be separated at the joint portion, there is an advantage of being excellent in replacement work or maintenance work of components. However, such belt has the following disadvantage in relation to the guide.

Figure 6:
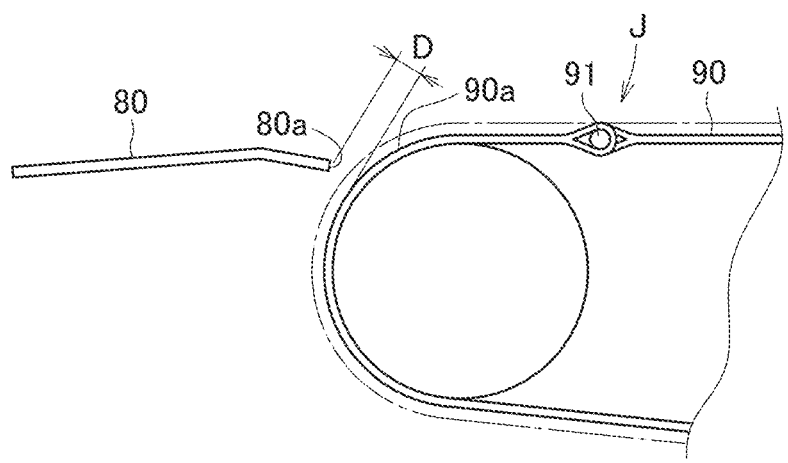
FIG. 6 is a diagram illustrating a positional relationship between a belt including a joint and a guide arranged close to the belt.

FIG. 6 is a diagram illustrating a positional relationship between the belt 90 including a joint J and a guide 80 arranged close to the belt 90.

The guide 80 illustrated in FIG. 6 is a member for receiving an object conveyed by the belt 90 and guiding the object to the downstream side. Therefore, a leading end 80a of the guide 80 is arranged close to a conveyance surface (outer peripheral surface) 90a of the belt 90 so that the object to be conveyed can be favorably received from the belt 90. In the case where the object to be conveyed is a thin member such as a sheet, it is preferable to minimize a distance D between the leading end 80a of the guide 80 and the conveyance surface 90a of the belt 90 so that the object (sheet) does not enter between the guide 80 and the belt 90.

However, as illustrated in FIG. 6, in the case of the belt 90 including the joint J, since a connecting member 91 connecting both ends of the belt 90 is inserted at the joint J, a portion of the joint J protrudes in a direction perpendicular to the conveyance surface 90a (toward the outer peripheral surface of the belt 90) than any other portion. Therefore, the guide 80 needs to be arranged with a large distance D with respect to the conveyance surface 90a secured so as not to interfere with the portion of the joint J. Therefore, the belt including the joint has a problem of difficulty in reducing the distance between the leading end of the guide and the conveyance surface of the belt as compared with a seamless belt including no joint.

Therefore, in the present embodiment, the guide has the following configuration so that the distance between the surface of the conveyance belt and the leading end of the guide can be reduced even with the conveyance belt including the joint. Hereinafter, a configuration of the guide according to an embodiment of the present disclosure will be described in detail.

Figure 7:
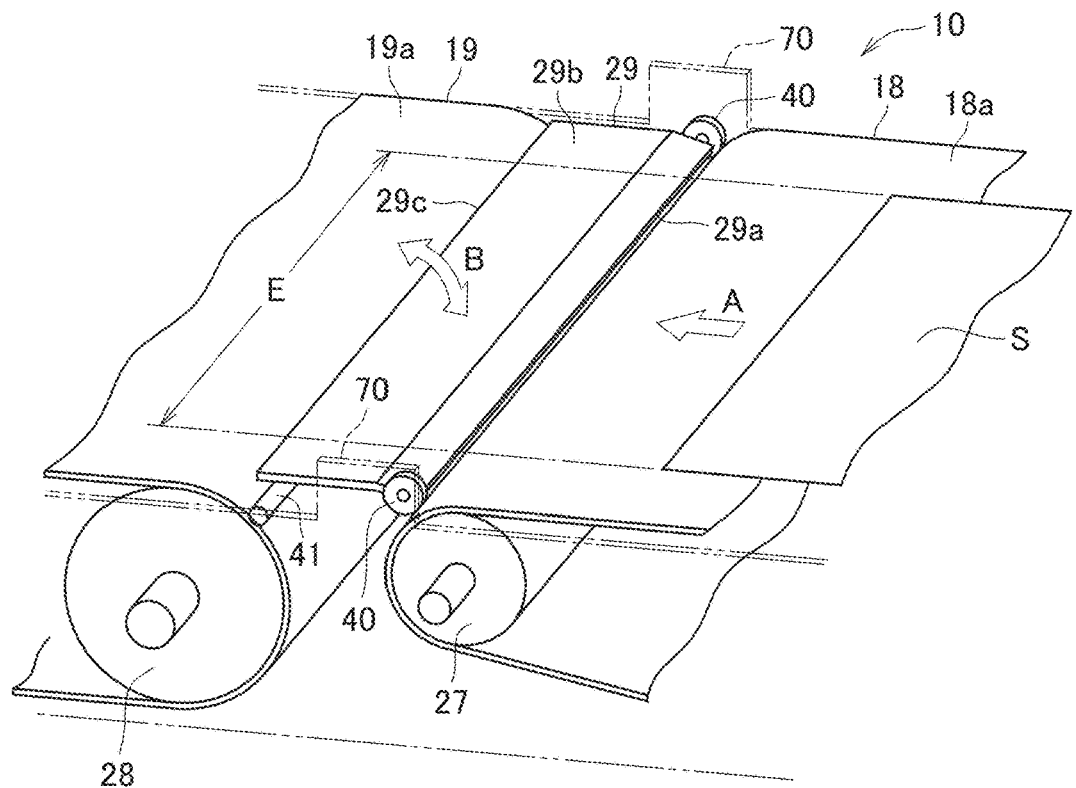
FIG. 7 is a perspective view of a guide and a peripheral portion thereof included in a drying device according to an embodiment of the present disclosure.

FIG. 7 is a perspective view illustrating a configuration of a guide 29 included in the conveyance device 10 according to the present embodiment and a peripheral portion thereof.

As illustrated in FIG. 7, the guide 29 is formed of a plate member extending in a width direction of the upstream conveyance belt 18 or the downstream conveyance belt 19. The guide 29 includes a guide surface 29b arranged substantially flush with the conveyance surface 18a of the upstream conveyance belt 18 and the conveyance surface 19a of the downstream conveyance belt 19 (upper surfaces of the conveyance belts 18 and 19 in FIG. 7), and the sheet S is guided from the upstream conveyance belt 18 to the downstream conveyance belt 19 along the guide surface 29b. Here, the "width direction of the upstream conveyance belt 18 or the downstream conveyance belt 19" means a direction orthogonal to the sheet conveyance direction A along the conveyance surface of the conveyance belt. In the present embodiment, since the guide 29 is longitudinally formed in the width direction of the conveyance belt, a direction in which the guide 29 extends in the width direction of the conveyance belt is referred to as a "longitudinal direction" of the guide 29 in the following description.

The width of the guide 29 in the longitudinal direction is set to be equal to or larger than the width of a conveyance region E in which the sheet S is conveyed and equal to or smaller than each of the width of the upstream conveyance belt 18 and the width of the downstream conveyance belt 19. As the material of the guide 29, a commonly-used material can be applied as long as the sliding resistance with respect to the sheet S is small. Examples of the material used for the guide 29 include, but not limited to, stainless used steel (SUS), an electrogalvanized steel sheet such as silver top, and an uneven steel sheet. Further, ribs may be disposed on the guide 29. The material of the guide 29 is preferably the same as that of the upstream conveyance belt 18 or the downstream conveyance belt 19. In addition, it is preferable that the surface roughness and the hardness of the guide 29 are substantially the same as those of the upstream conveyance belt 18 or the downstream conveyance belt 19.

As illustrated in FIG. 7, a pair of frame members 70 that supports the conveyance belts 18 and 19, and the support rollers 27 and 28 in addition to the guide 29 is disposed on both ends in the longitudinal direction of the guide 29. The guide 29 is attached to each frame member 70 so as to be swingable in a direction of an arrow B in FIG. 7. Specifically, the guide 29 is rotatably supported around a support shaft 41 arranged on a rear end 29c side of the guide 29. As a result, the leading end 29a (end on a side opposite to the rear end 29c) of the guide 29 is configured to be swingable in a direction to approach and a direction to move away from the conveyance surface 18a of the upstream conveyance belt 18.

A pair of rotators 40 in contact with the conveyance surface 18a of the upstream conveyance belt 18 is disposed at both ends in the longitudinal direction of the guide 29. Each rotator 40 is arranged outside a conveyance region E where the sheet S is conveyed so as not to come into contact with the sheet S to be conveyed. In a state in which each rotator 40 is in contact with the conveyance surface 18a of the upstream conveyance belt 18, the leading end 29a of the guide 29 is arranged to approach (so as not to be in contact with) the conveyance surface 18a of the upstream conveyance belt 18.

Figure 8:
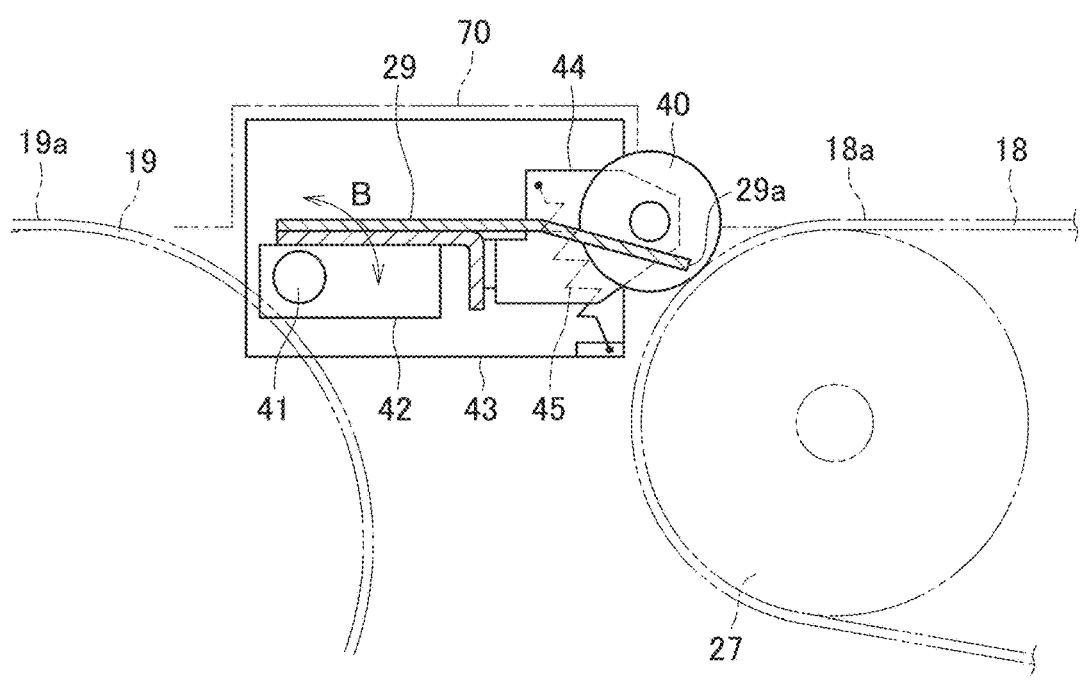
FIG. 8 is a cross-sectional view of the guide of FIG. 7 as seen in a longitudinal direction thereof.

FIG. 8 is a cross-sectional view of the guide 29 as seen in the longitudinal direction thereof.

As illustrated in FIG. 8, the guide 29 is attached to and held by a movable stay 42, which is a guide holding member. The movable stay 42 includes the support shaft 41, which is the swing center of the guide 29, and when the movable stay 42 rotates about the support shaft 41, the guide 29, together with the movable stay 42, swings in a direction intersecting the conveyance surface 18a of the upstream conveyance belt 18 (direction of arrow B in FIG. 8). The movable stay 42 is rotatably attached to a fixed stay 43 as a supporting member via the support shaft 41. In the present embodiment, the support shaft 41 is attached to the fixed stay 43 so as to be movable in the axial direction (so as to have a backlash) so that even if the guide 29 and the movable stay 42 thermally expand in the longitudinal direction by the heat of the drying device 30, the support shaft 41 does not interfere with the fixed stay 43 to limit the swing of the guide 29 or damage the members. The fixed stay 43 is fixed so as not to be movable with respect to the frame member 70.

A rotator holding member 44 that rotatably holds the rotator 40 is attached to the movable stay 42. The rotator 40 is arranged so as to protrude toward the upstream conveyance belt 18 beyond the leading end 29a of the guide 29. Therefore, in a state in which the rotator 40 is in contact with the conveyance surface 18a of the upstream conveyance belt 18, the leading end 29a of the guide 29 is arranged so as not to be in contact with the conveyance surface 18a.

A spring 45 as a biasing member is attached between the rotator holding member 44 and the fixed stay 43. The spring 45 is provided to bias the rotator 40 toward the upstream conveyance belt 18. As a result, the rotator 40 is held in a state of being in contact with the conveyance surface 18a of the upstream conveyance belt 18.

Figure 9:
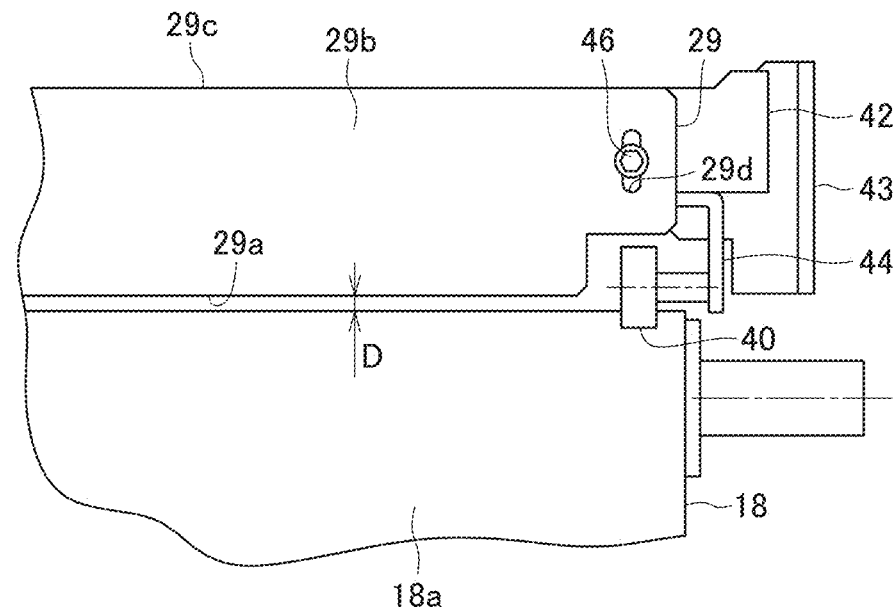
FIG. 9 is a plan view of the guide of FIG. 7, illustrating a configuration of one end in a longitudinal direction of the guide.

FIG. 9 is a plan view illustrating a configuration of one end side in the longitudinal direction of the guide 29.

As illustrated in FIG. 9, a hole 29d into which a fixing member 46 such as a screw is inserted is disposed on one end side in the longitudinal direction of the guide 29. The hole 29d is also disposed on an opposite end side (the other end side in the longitudinal direction) of the one end side in the longitudinal direction of the guide 29 illustrated in FIG. 9. When the fixing member 46 is inserted into each hole 29d and attached to the movable stay 42, the guide 29 is fixed to the movable stay 42.

The hole 29d is formed of a long hole extending along the guide surface 29b in a direction (vertical direction in FIG. 9) intersecting the longitudinal direction of the guide 29. Therefore, when the guide 29 is moved in a direction in which the hole 29d extends, a fixing position of the guide 29 can be changed to an upward direction or a downward direction in FIG. 9. That is, the guide 29 can be moved in the direction to approach and the direction to move away from the conveyance surface 18a of the upstream conveyance belt 18. Accordingly, it is possible to adjust the distance D between the leading end 29a of the guide 29 and the conveyance surface 18a.

Figure 10:
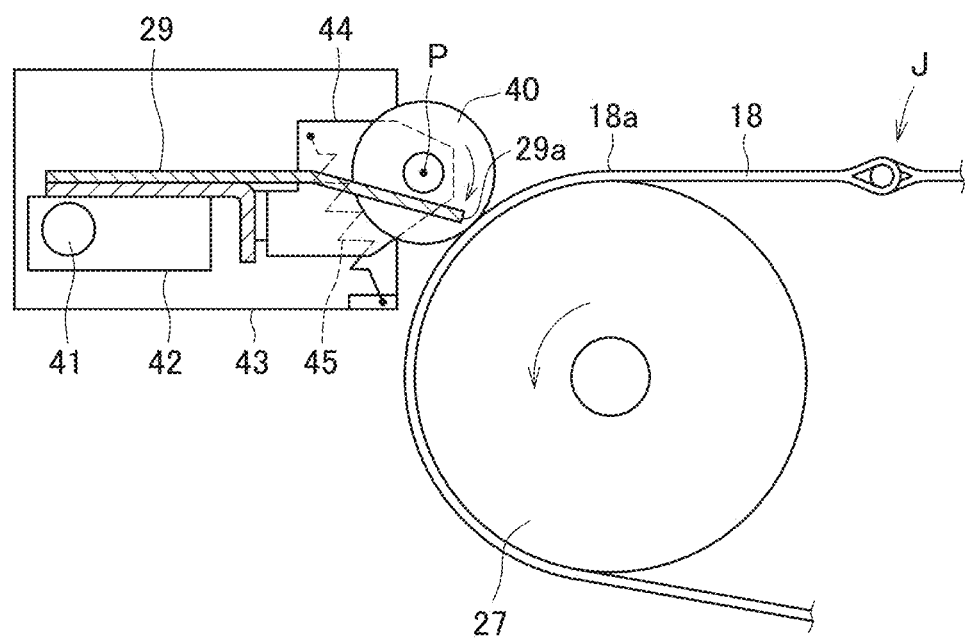
FIG. 10 is a diagram illustrating a rotator contacting a portion other than a joint.
Figure 11:
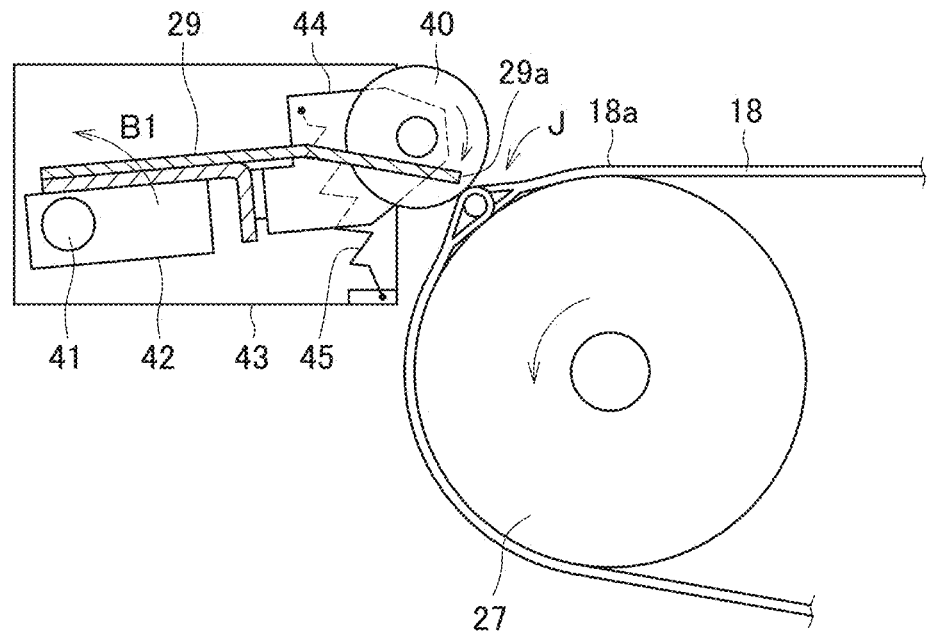
FIG. 11 is a diagram illustrating the rotator contacting a joint portion.

Subsequently, the operation of the guide 29 according to the present embodiment will be described with reference to FIGS. 10 and 11. In FIGS. 10 and 11, the downstream conveyance belt 19 is not illustrated.

As illustrated in FIG. 10, in a state in which the leading end 29a of the guide 29 is arranged so as to approach the conveyance surface 18a of the upstream conveyance belt 18, the rotator 40 is held in a state of being in contact with the conveyance surface 18a by a biasing force of the spring 45. When the upstream conveyance belt 18 rotates from this state, the rotator 40 also rotates accordingly. In this case, since the rotator 40 is a circular rotator having a constant distance from a rotation center P to the outer peripheral surface, even when the rotator 40 rotates, a distance between the leading end 29a of the guide 29 and the conveyance surface 18a of the upstream conveyance belt 18 is maintained constant.

Thereafter, as illustrated in FIG. 11, when the joint J reaches a position facing the rotator 40 along with the rotation of the upstream conveyance belt 18, the rotator 40 comes into contact with the portion of the joint J, so that the guide 29 swings in a direction of arrow B1 in FIG. 11. In other words, when the portion of the joint J comes into contact with the rotator 40, the rotator 40 is pushed and moved in a direction away from the conveyance surface 18a, so that the leading end 29a of the guide 29 also swings in a direction away from the conveyance surface 18a (direction of arrow B1) in conjunction with displacement of the rotator 40. As a result, a distance between the leading end 29a of the guide 29 and an outer peripheral surface of the support roller 27 increases, and a distance necessary for the joint J to pass is secured, so that the portion of the joint J can be avoided from coming into contact with the leading end 29a of the guide 29. When the leading end 29a of the guide 29 swings in the direction away from the conveyance surface 18a, the distance between the leading end 29a of the guide 29 and the portion of the joint J may be larger than or the same as the distance between the leading end 29a of the guide 29 and the conveyance surface 18a in the portion other than the joint J. In short, it is sufficient that the guide 29 can swing in such a manner that the leading end 29a of the guide 29 can avoid the contact with the portion of the joint J.

Thereafter, when the portion of the joint 1 passes through the position facing the rotator 40, the leading end 29a of the guide 29 swings in a direction to approach the conveyance surface 18a (a direction opposite to the arrow B1 direction in FIG. 11), and the guide 29 and the rotator 40 are returned to the original positions (positions illustrated in FIG. 10).

As described above, in the present embodiment, the guide 29 is displaced (swung) in conjunction with the displacement of the rotator 40 due to the contact between the portion of the joint J and the rotator 40, so that the contact of the guide 29 with the portion of the joint J can be avoided. As a result, it is not necessary to set the distance between the leading end 29a of the guide 29 and the conveyance surface 18a to be large in consideration of interference between the guide 29 and the portion of the joint J, so that the distance can be set to be small. Therefore, according to the configuration of the present embodiment, even with the conveyance belt including the joint, the distance between the surface of the conveyance belt and the leading end of the guide can be reduced, and entrance of the sheet between the guide and the conveyance belt can be reduced. As a result, the sheet can be smoothly and reliably guided by the guide.

In the present embodiment, since the guide 29 is configured to swing about the support shaft 41 to approach and move away from the conveyance surface 18a, displacement of the rear end 29c side of the guide 29 can be reduced as compared with a configuration in which the guide 29 linearly slides to approach and move away from the conveyance surface 18a. Therefore, in the present embodiment, the guide 29 (rear end 29c) can be arranged close to the conveyance surface 19a of the downstream conveyance belt 19, and the sheet can be smoothly and reliably transferred between the guide 29 and the downstream conveyance belt 19.

The present disclosure does not exclude a configuration in which the guide linearly slides to approach and move away from the conveyance surface of the conveyance belt. When there is no member arranged close to the rear end of the guide, it is not necessary to consider interference between the member and the rear end of the guide, so that it is also possible to adopt a configuration in which the guide is linearly slid. On the other hand, in the configuration in which the guide 29 is arranged between the upstream conveyance belt 18 and the downstream conveyance belt 19 and it is difficult to secure a space for linearly moving the guide 29 as in the present embodiment, it is preferable to adopt the configuration in which the guide is swung.

Figure 12:
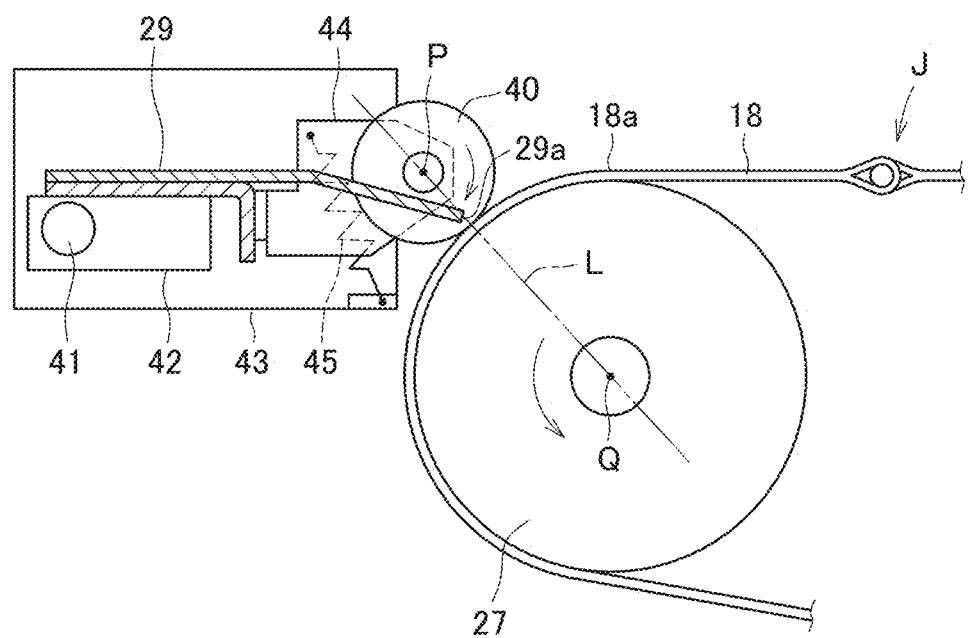
FIG. 12 is a diagram illustrating a preferred position of a leading end of a guide.

As illustrated in FIG. 12, as seen in an axial direction of the support roller 27, the position of the leading end 29a of the guide 29 is preferably set on a straight line L passing through a rotation center Q of the support roller 27 (specifically, the support roller 27 which the rotator 40 faces via the upstream conveyance belt 18) and the rotation center P of the rotator 40. By arranging the leading end 29a of the guide 29 at such a position, the leading end 29a of the guide 29 can be greatly swung (retracted) in accordance with a timing at which the portion of the joint J reaches the position of the leading end 29a of the guide 29, so that interference between the leading end 29a of the guide 29 and the portion of the joint J can be more reliably avoided.

Figure 13:
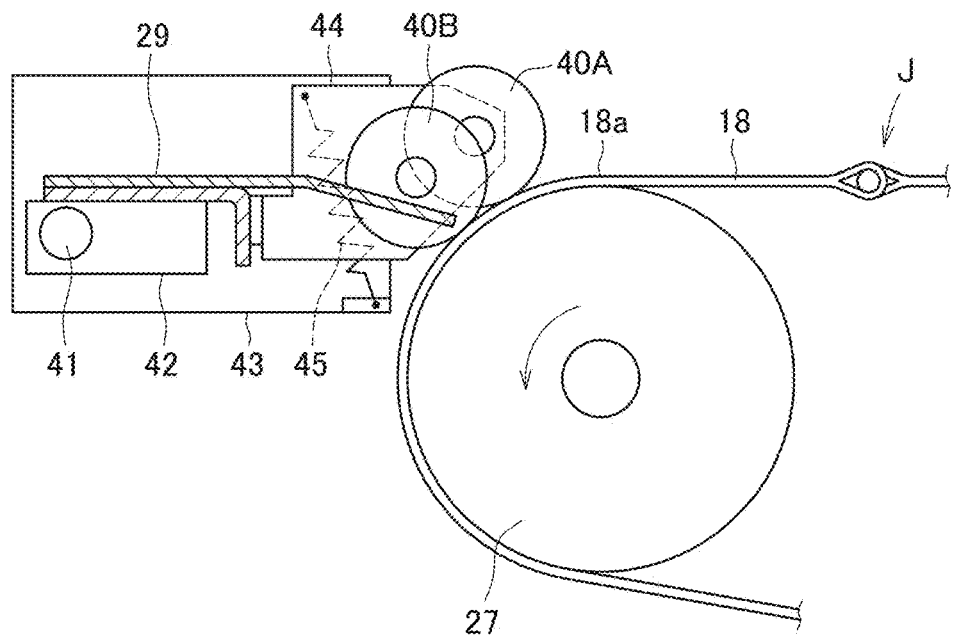
FIG. 13 is a diagram illustrating a guide according to a modification of the present disclosure.
Figure 14:
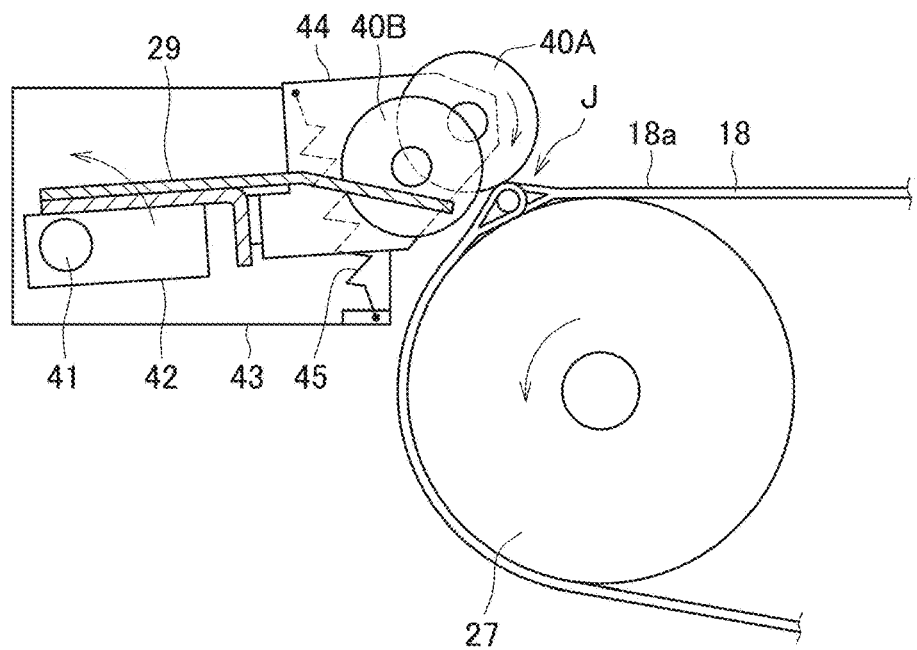
FIG. 14 is a diagram illustrating a joint portion contacting a first rotator.
Figure 15:
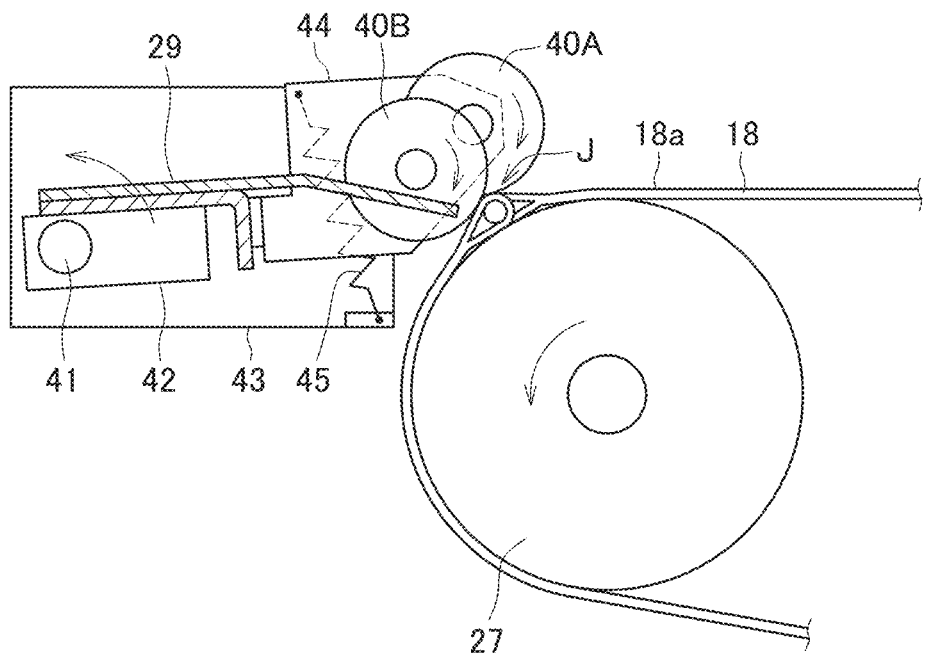
FIG. 15 is a diagram illustrating the joint portion contacting a second rotator.

As in the example illustrated in FIG. 13, a plurality of rotators 40A and 40B may be arranged side by side in the sheet conveyance direction. In the example illustrated in FIG. 13, the two rotators 40A and 40B are arranged at the position of the leading end 29a of the guide 29 and a position on the upstream side of the leading end in the sheet conveyance direction. In this case, as illustrated in FIG. 14, when the portion of the joint J comes into contact with a first rotator 40A (upstream side), the guide 29 swings in the direction away from the conveyance surface 18a in conjunction with the displacement of the rotator 40A due to the contact. Subsequently, as illustrated in FIG. 15, the portion of the joint J comes into contact with a second rotator 40B (downstream side), so that the guide 29 is held in a state of being swung in the direction away from the conveyance surface 18a. That is, before the portion (protrusion) of the joint J completely passes through the contact position with the first rotator 40A, the portion of the joint J comes into contact with the second rotator 40B, so that the guide 29 is held in a swinging state. Therefore, in this case, the guide 29 is held in a state of being swung in the direction away from the conveyance surface 18a until the portion of the joint J passes through the second rotator 40B after coming into contact with the first rotator 40A. As a result, the guide 29 can be continuously retracted from a stage earlier than the reach of the portion of the joint J, so that the contact between the guide 29 and the portion of the joint J can be more reliably avoided. The number of rotators arranged in the sheet conveyance direction is not limited to two, and may be three or more. The rotators may be arranged not only at a position on the upstream side in the sheet conveyance direction with respect to the position of the leading end 29a of the guide 29 but also at a position on the downstream side. When a plurality of rotators are mounted, the position of the leading end 29a of the guide 29 is preferably set on the straight line L passing the rotation center P of any one of the rotators and the rotation center Q of the support roller 27 when viewed from the axial direction of the support roller 27, as in the embodiment of FIG. 12. In other words, the rotation center P of any one of the rotators is preferably disposed on the straight line L passing the leading end 29a of the guide 29 and the rotation center Q of the support roller 27 when viewed from the axial direction of the support roller 27. Thus, the leading end 29a of the guide 29 can be greatly swung (retracted) in accordance with a point in time at which the portion of the joint J reaches the position of the leading end 29a of the guide 29, so that interference between the leading end 29a of the guide 29 and the portion of the joint J can be more reliably avoided.

Although the embodiment of the present disclosure and the variation thereof have been described above, the present disclosure is not limited to the above-described embodiment, and can be appropriately modified without departing from the gist of the disclosure.

Figure 16:
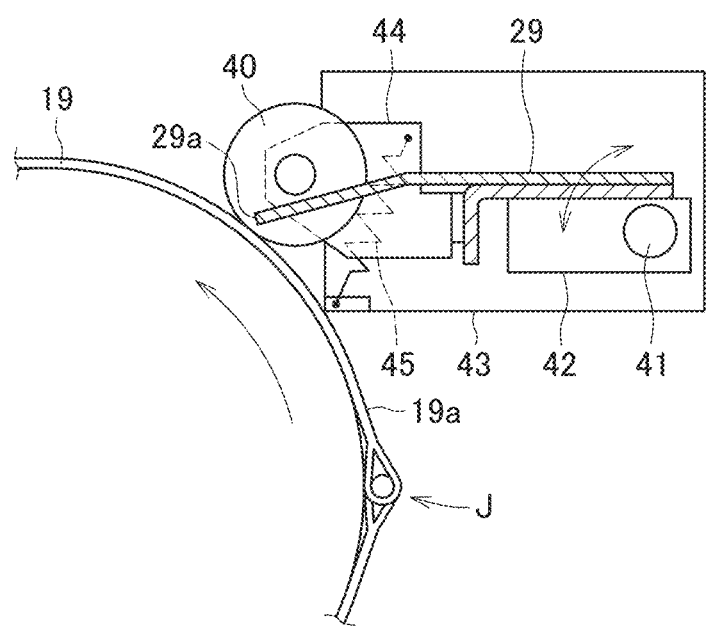
FIG. 16 is a diagram illustrating an example in which a leading end of a guide approaches and moves away from a downstream conveyance belt.

In the above-described embodiment, the configuration in which the leading end 29a of the guide 29 swings in the direction to approach and the direction to move away from the conveyance surface 18a of the upstream conveyance belt 18 is taken as an example, but as in the example illustrated in FIG. 16, the leading end 29a of the guide 29 may be arranged to approach the conveyance surface 19a of the downstream conveyance belt 19. In this case, when the portion of the joint J of the downstream conveyance belt 19 comes into contact with the rotator 40, the leading end 29a of the guide 29 swings in the direction away from the conveyance surface 19a as in the above-described embodiment, so that the interference between the leading end 29a of the guide 29 and the joint portion can be avoided.

Embodiments of the present disclosure are not limited to the configuration using the conveyance belt in which the joint portion protrudes as described above, and are also applicable to a configuration using a conveyance belt in which the joint portion is recessed in a concave shape as compared with other portions.

In the configuration using the conveyance belt in which the joint portion has the concave shape, the distance between the guide and the conveyance belt increases at the joint portion as opposed to the case where the joint portion has a convex shape, so that there is a possibility that a disadvantage might occur that the sheet enters between the guide and the conveyance belt. However, even in such a configuration, according to an embodiment of the present disclosure, entry of the sheet at the joint portion can be reduced. For example, according to an embodiment of the present disclosure, the guide is displaced in the direction to approach the conveyance surface in accordance with the shape of the joint portion, so that the distance between the guide and the conveyance belt at the joint portion can be reduced, and the entry of the sheet between the guide and the conveyance belt can be reduced.

The present disclosure is also applicable to the following drying device. Hereinafter, a configuration of the drying device according to another embodiment of the present disclosure will be described.

Figure 17:
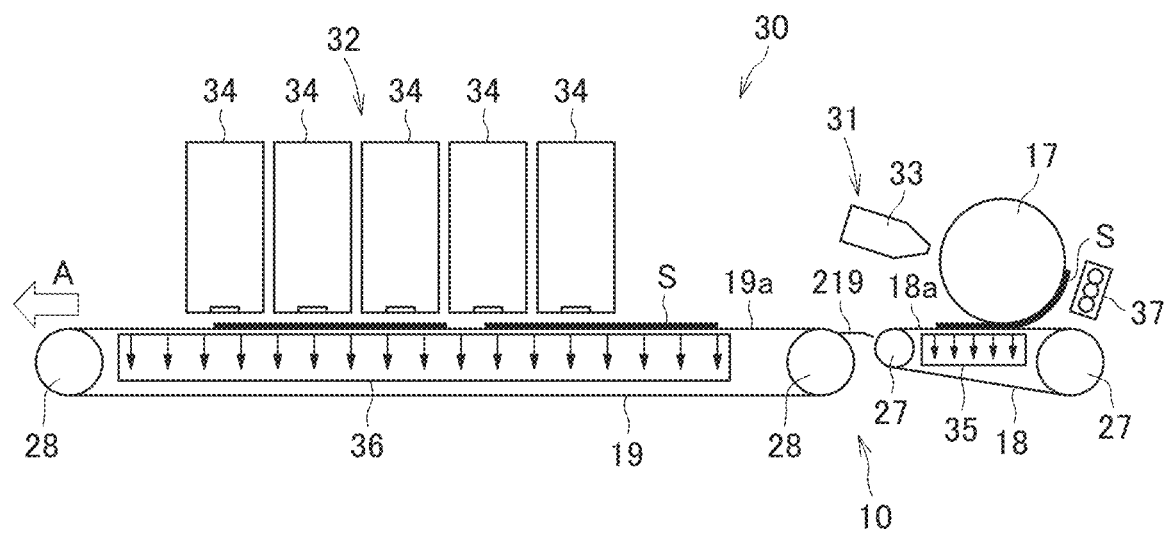
FIG. 17 is a diagram illustrating a configuration of a drying device according to another embodiment of the present disclosure.

In the drying device 30 illustrated in FIG. 17, the first heating unit 31 includes an infrared irradiator 37 in addition to the warm air generator 33. Except for this, the drying device has the same configuration as the drying device according to the above-described embodiment (refer to FIG. 3).

In this case, when the sheet S is borne on the transfer cylinder 17, the sheet S is heated by the heat of the warm air generator 33 and is heated by the infrared rays emitted from the infrared irradiator 37. As a result, the drying of the ink on the sheet S can be promoted as compared with the drying device according to the above-described embodiment.

Subsequently, in the drying device 30 illustrated in FIG. 18, a blower fan 38 as a cooling device is disposed at a position facing the upstream conveyance belt 18. Air is blown from the blower fan 38 to the upstream conveyance belt 18 to cool the upstream conveyance belt 18, so that a temperature rise of the upstream conveyance belt 18 is reduced. In this case, since the temperature rise of the sheet S conveyed by the upstream conveyance belt 18 is also reduced, the occurrence of waviness of the sheet S can also be reduced in addition to density unevenness due to movement of pigment of the ink.

Figure 18:
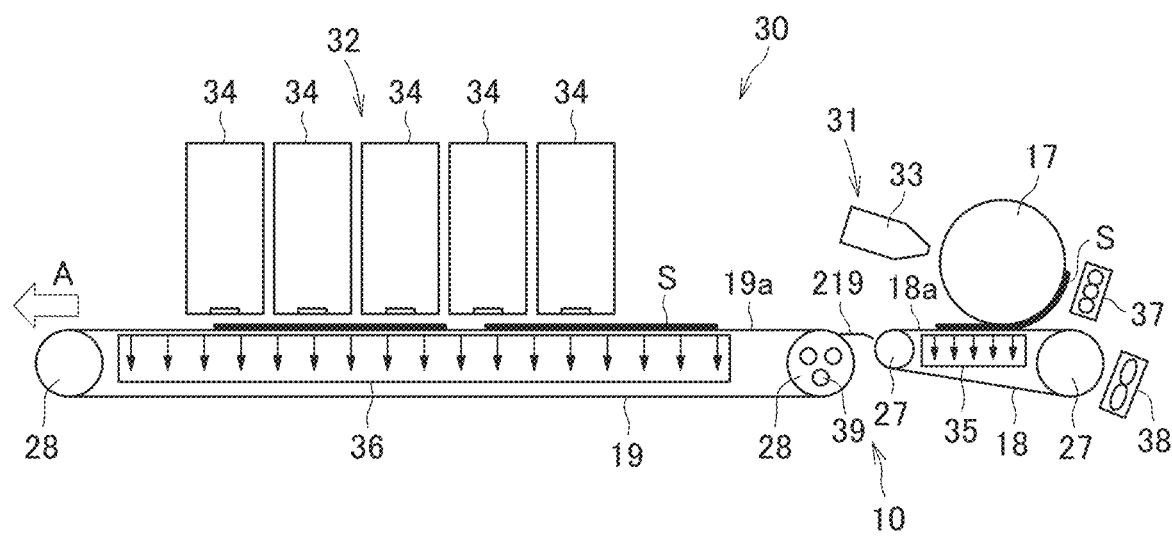
FIG. 18 is a diagram illustrating a configuration of a drying device according to still another embodiment of the present disclosure.

In the drying device 30 illustrated in FIG. 18, the second heating unit 32 includes a heating element 39 that heats the downstream conveyance belt 19 in addition to a plurality of ultraviolet irradiators 34. The heating element 39 is, for example, an infrared heater (IR lamp), and is arranged in the support roller 27 on the upstream side that supports the downstream conveyance belt 19. When the heating element 39 generates heat, the downstream conveyance belt 19 is heated via the support roller 27.

Therefore, when the sheet S is held on the downstream conveyance belt 19, the sheet S is heated by the heat of the heated downstream conveyance belt 19. Furthermore, since the sheet S is irradiated by each ultraviolet irradiator 34 with ultraviolet rays, drying of the ink on the sheet S is effectively promoted. Except for the configuration described above, the configuration is the same as that of the drying device illustrated in FIG. 17, so that the description thereof is omitted.

In the above-described embodiment, the case where the conveyance device according to the present disclosure is mounted on the inkjet image forming apparatus being an example of a liquid discharge apparatus has been described as an example, but the conveyance device according to the present disclosure is also applicable to other liquid discharge apparatuses.

The "liquid discharge apparatus" means an apparatus that includes a liquid discharger and drives the liquid discharger to discharge liquid onto a sheet. Therefore, the "liquid discharge apparatus" is not limited to one that visualizes a meaningful image such as a character or a figure by the discharged liquid. Examples of the "liquid discharge apparatus" include an apparatus that forms a pattern having no meaning in itself, an apparatus that forms a three-dimensional image, and a treatment liquid discharge apparatus that discharges a treatment liquid onto a surface of a sheet for the purpose of modifying the surface of the sheet.

The "liquid discharge apparatus" to which the conveyance device according to the present disclosure is applied may include devices to feed, convey, and eject the sheet, a pretreatment device, and a post-processing device.

In the "liquid discharge apparatus", the liquid discharger may move relative to the sheet, or the liquid discharger is not necessarily move relative to the sheet. Specific examples of the "liquid discharge apparatus" include a serial type apparatus that moves the liquid discharge head (liquid discharger) or a line type apparatus that does not move the liquid discharge head (liquid discharger).

The above-described "sheet" represents a sheet on which liquid can be at least temporarily adhered, and includes a sheet on which liquid is adhered and fixed, or a sheet to which liquid is adhered to permeate. Specific examples thereof include a recording medium such as paper, recording paper, a recording sheet, a film, and cloth, and an electronic substrate. The "sheet" may be a long sheet (roll paper) wound in a roll shape in addition to a sheet (cut paper) cut into a predetermined size in the sheet conveyance direction in advance.

Examples of the material of the "sheet" include any material on which liquid can be adhered even temporarily, such as paper, thread, fiber, fabric, leather, metal, plastic, glass, wood, and ceramic.

"Liquid" discharged by the "liquid discharge apparatus" is not limited to a particular liquid as long as the liquid has a viscosity or surface tension dischargeable from the liquid discharger. However, preferably, the viscosity of the liquid is not greater than 30 mPa·s under ordinary temperature and ordinary pressure or by heating or cooling. More specific examples thereof include solutions, suspensions, and emulsions containing solvents such as water and organic solvents, colorants such as dyes and pigments, function-imparting materials such as polymerizable compounds, resins, and surfactants, biocompatible materials such as deoxyribonucleic acid (DNA), amino acids, proteins, and calcium, and edible materials such as natural pigments. These can be used for, for example, inkjet ink, surface treatment liquid, electronic element, constituent parts of light emitting element, liquid for forming electronic circuit resist pattern, and material liquid for three-dimensional modeling.

The conveyance device according to an embodiment of the present disclosure is not limited to a device mounted on a liquid discharge apparatus such as an inkjet image forming apparatus. For example, embodiments of the present disclosure are also applicable to a conveyance device mounted on an electrophotographic image forming apparatus that forms an image using toner, or a conveyance device mounted on a belt conveyor that conveys an object other than a sheet.

To summarize the above-described aspects of the present disclosure, embodiments of the present disclosure include a conveyance device, a drying device, an image forming apparatus, and a liquid discharge apparatus having at least the following configurations.

First Aspect

In a first aspect of the present disclosure, a conveyance device includes: a conveyance member having a conveyance surface with a joint, to convey the object with the object held or placed on the conveyance surface; a guide arranged to approach the conveyance surface and guide the object from or to the conveyance member; and a rotator to contacts the conveyance surface. The guide displaces in a direction perpendicular to the conveyance surface, in conjunction with displacement of the rotator when the rotator contacts the joint.

Second Aspect

In a second aspect of the present disclosure, in the conveyance device according to the first aspect, the joint includes a protruding portion protruding from the conveyance surface, and the guide displaces in a direction away from the conveyance surface in conjunction with displacement of the rotator when the rotator contacts the protruding portion.

Third Aspect

In a third aspect of the present disclosure, in the conveyance device according to the first or second aspect, the guide is swingable about a support shaft and displaceable with respect to the conveyance surface.

Fourth Aspect

In a fourth aspect of the present disclosure, in the conveyance device according to any one of the first to third aspects, the conveyance member is a conveyance belt wound around a support roller, and a leading end of the guide having approached a position close to the conveyance belt is placed on a straight line passing a rotation center of the support roller and a rotation center of the rotator.

Fifth Aspect

In a fifth aspect of the present disclosure, the conveyance device according to any one of the first to fourth aspects includes a plurality of rotators, including the rotator, arranged side by side in a conveyance direction in which the conveyance member conveys the object to be conveyed.

Sixth Aspect

In a sixth aspect of the present disclosure, in the conveyance device according to any one of the first to fifth aspects, the conveyance member includes a first conveyance member and a second conveyance member arranged on a downstream side of the first conveyance member in a conveyance direction in which the conveyance member conveys the object, and the guide guides the object from the first conveyance member to the second conveyance member between the first conveyance member and the second conveyance member.

Seventh Aspect

In a seventh aspect of the present disclosure, in the conveyance device according to the sixth aspect, the first conveyance member conveys the object subjected to a first drying process, and the second conveyance member conveys the object subjected to a second drying process.

Eighth Aspect

In an eighth aspect of the present disclosure, a drying device includes: the conveyance device according to any one of the first to seventh aspects to convey the object to be conveyed; and a dryer to dry the object.

Ninth Aspect

In a ninth aspect of the present disclosure, an image forming apparatus includes: an image forming device to form an image on a sheet; and the conveyance device according to any one of the first to seventh aspects to convey the sheet.

Tenth Aspect

In a tenth aspect of the present disclosure, a liquid discharge apparatus includes a liquid discharger to discharge liquid onto a sheet; and the conveyance device according to any one of the first to seventh aspects to convey the sheet.

The present disclosure is not limited to specific embodiments described above, and numerous additional modifications and variations are possible in light of the teachings within the technical scope of the appended claims. It is therefore to be understood that the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A conveyance device, comprising:
a conveyance member having a conveyance surface with a joint, the conveyance member to convey an object to be conveyed, with the object on the conveyance surface;
a guide to approach the conveyance surface and guide the object from or to the conveyance member; and
a rotator to contact the conveyance surface,
the guide to displace in a direction perpendicular to the conveyance surface, in conjunction with displacement of the rotator when the rotator contacts the joint.

2. The conveyance device according to claim 1,
wherein the joint includes a protruding portion protruding from the conveyance surface, and
wherein the guide is to displace in a direction away from the conveyance surface, in conjunction with displacement of the rotator when the rotator contacts the protruding portion.

3. The conveyance device according to claim 1,
wherein the guide is swingable about a support shaft to displace with respect to the conveyance surface.

4. The conveyance device according to claim 1,
wherein the conveyance member is a conveyance belt wound around a support roller, and
wherein a leading end of the guide having approached the conveyance belt is on a straight line passing a rotation center of the support roller and a rotation center of the rotator.

5. The conveyance device according to claim 1, further comprising a plurality of rotators, including the rotator, arranged side by side in a conveyance direction in which the conveyance member conveys the object.

6. The conveyance device according to claim 1, further comprising another conveyance member disposed downstream from the conveyance member in a conveyance direction in which the conveyance member conveys the object, and
wherein the guide guides the object from the conveyance member to said another conveyance member between the conveyance member and said another conveyance member.

7. The conveyance device according to claim 6,
wherein the conveyance member conveys the object subjected to a first drying process, and said another conveyance member conveys the object subjected to a second drying process.

8. A drying device comprising:
the conveyance device according to claim 1 to convey the object to be conveyed; and
a dryer to dry the object to be conveyed.

9. An image forming apparatus comprising:
an image forming device to form an image on a sheet; and
the conveyance device according to claim 1 to convey the sheet.

10. A liquid discharge apparatus comprising:
a liquid discharger to discharge liquid onto a sheet; and
the conveyance device according to claim 1 to convey the sheet.

* * * * *